(12) United States Patent
Kudoh (10) Patent No.: US 11,239,760 B2
(45) Date of Patent: Feb. 1, 2022

(54) POWER CONVERSION SYSTEM AND CONTROL METHOD FOR VOLTAGE CONVERSION CIRCUIT

(71) Applicant: PANASONIC INTELLECTUAL PROPERTY MANAGEMENT CO., LTD., Osaka (JP)

(72) Inventor: Yuji Kudoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/041,248

(22) PCT Filed: Mar. 25, 2019

(86) PCT No.: PCT/JP2019/012317
§ 371 (c)(1),
(2) Date: Sep. 24, 2020

(87) PCT Pub. No.: WO2019/188876
PCT Pub. Date: Oct. 3, 2019

(65) Prior Publication Data
US 2021/0013811 A1    Jan. 14, 2021

(30) Foreign Application Priority Data
Mar. 29, 2018    (JP) .............................. JP2018-063911

(51) Int. Cl.
*H02M 5/297*    (2006.01)
*H02M 5/14*    (2006.01)
(Continued)

(52) U.S. Cl.
CPC ............. *H02M 5/297* (2013.01); *H02M 5/14* (2013.01); *H02M 5/293* (2013.01); *H02M 5/2932* (2021.05); *H02P 6/28* (2016.02)

(58) Field of Classification Search
CPC ........ H02M 5/297; H02M 5/14; H02M 5/293; H02M 5/2932; H02P 6/28
See application file for complete search history.

(56) References Cited

U.S. PATENT DOCUMENTS

2014/0056038 A1    2/2014 Yamamoto et al.
2014/0369529 A1*   12/2014 Quinn .................. H03F 3/2171
                                                  381/121
(Continued)

FOREIGN PATENT DOCUMENTS

| JP | H05-038143 A | 2/1993 |
| JP | 2004-104973 A | 4/2004 |
| JP | 5996531 B2 | 9/2016 |

OTHER PUBLICATIONS

International Search Report and Written Opinion issued in International Patent Application No. PCT/JP2019/012317, dated May 21, 2019; with partial English translation.

*Primary Examiner* — Adolf D Berhane
(74) *Attorney, Agent, or Firm* — McDermott Will and Emery LLP (57) ABSTRACT

A power conversion system converts an input alternating-current voltage having a first frequency into an output alternating-current voltage having a second frequency lower than the first frequency. The power conversion system includes a voltage converter, a PDM controller, and a feedback controller. The voltage converter converts the input alternating-current voltage into the output alternating-current voltage in accordance with control signals and outputs the output alternating-current voltage to a load. The PDM controller performs pulse density modulation of an output voltage command value of the output alternating-current voltage to generate the control signals and outputs the control signals to the voltage converter. The feedback controller generates the output voltage command value (Continued)

based on an output current value of the voltage converter and a state of the load and outputs the output voltage command value to the PDM controller.

20 Claims, 7 Drawing Sheets

(51) Int. Cl.
*H02M 5/293* (2006.01)
*H02P 6/28* (2016.01)

(56) References Cited

U.S. PATENT DOCUMENTS

| 2015/0003136 | A1* | 1/2015 | Inomata | H02M 1/14 |
| | | | | 363/163 |
| 2018/0302006 | A1* | 10/2018 | Smidt | H02M 1/126 |
| 2021/0249966 | A1* | 8/2021 | Tobayashi | H02P 27/08 |

* cited by examiner

POWER CONVERSION SYSTEM AND CONTROL METHOD FOR VOLTAGE CONVERSION CIRCUIT

CROSS-REFERENCE OF RELATED APPLICATIONS

This application is the U.S. National Phase under 35 U.S.C. § 371 of International Patent Application No. PCT/JP2019/012317, filed on Mar. 25, 2019, which in turn claims the benefit of Japanese Application No. 2018-063911, filed on Mar. 29, 2018, the entire disclosures of which Applications are incorporated by reference herein.

TECHNICAL FIELD

The present disclosure generally relates to power conversion systems and control methods for voltage conversion circuits, and specifically, to a power conversion system configured to perform AC/AC conversion and a control method for a voltage conversion circuit.

BACKGROUND ART

An alternating current conversion circuit (power conversion system) configured to perform AC/AC conversion has been known (see, for example, Patent Literature 1).

An AC converter described in Patent Literature 1 converts a single-phase input AC voltage with a frequency f0 into a three-phase output AC voltage with a frequency f1 that is lower than f0. The AC converter includes a switching section (voltage converter), a filter section, and a switching control section. The switching section converts the input AC voltage in response to a control signal and outputs the converted voltage to a phase that has been selected in accordance with the control signal. The filter section filters out high frequency components from the converted voltage, thereby converting the converted voltage into the output AC voltage. The switching control section performs a pulse density modulation on a phase-by-phase basis and based on a reference signal with the frequency f1 which is associated with the output AC voltage of each phase, synchronously with a zero cross of the input AC voltage. The switching control section generates the control signal according to a pulse generation status by the pulse density modulation and the polarity of the input AC voltage and sends out the control signal to the switching section. Moreover, the switching control section performs the pulse density modulation based on a space vector modulation.

In the power conversion system, improvement of the accuracy of output control of the voltage converter is desired.

CITATION LIST

Patent Literature

Patent Literature 1: JP5996531 B2.

SUMMARY OF INVENTION

In view of the foregoing, it is an object of the present disclosure to provide a power conversion system and a control method for a voltage conversion circuit, wherein the power conversion system and the control method improve the accuracy of output control of a voltage converter.

A power conversion system according to one aspect of the present disclosure is configured to convert an input alternating-current voltage having a first frequency into an output alternating-current voltage having a second frequency lower than the first frequency. The power conversion system includes a voltage converter, a PDM controller, and a feedback controller. The voltage converter is configured to convert the input alternating-current voltage into the output alternating-current voltage in accordance with a control signal and output the output alternating-current voltage to a load. The PDM controller is configured to perform pulse density modulation of an output voltage command value of the output alternating-current voltage to generate a modulation signal, generate the control signal in accordance with the modulation signal, a polarity of the input alternating-current voltage, and a polarity of the output voltage command value, and output the control signal to the voltage converter, The feedback controller is configured to generate the output voltage command value based on an output current value of the voltage converter and a state of the load and output the output voltage command value to the PDM controller.

A control method for a voltage conversion circuit according to one aspect of the present disclosure is a method for controlling a voltage conversion circuit configured to convert an input alternating-current voltage having a first frequency into an output alternating-current voltage having a second frequency lower than the first frequency in accordance with a control signal and output the output alternating-current voltage to a load. The control method for the voltage conversion circuit includes a PDM control step and a feedback control step. The PDM control step is a step of performing pulse density modulation of an output voltage command value of the output alternating-current voltage to generate a modulation signal and generating the control signal in accordance with the modulation signal, a polarity of the input alternating-current voltage, and a polarity of the output voltage command value. The feedback control step is a step of generating the output voltage command value based on an output current value supplied to the load and a state of the load.

DESCRIPTION OF EMBODIMENTS

An embodiment and variations described below are mere examples of the present disclosure. The present disclosure is not limited to the embodiment and variations. The present disclosure may be modified variously without departing from the scope of technical idea of the present disclosure, even if not including the embodiment and variations, according to design or the like.

(1) Schema

Figure 1:
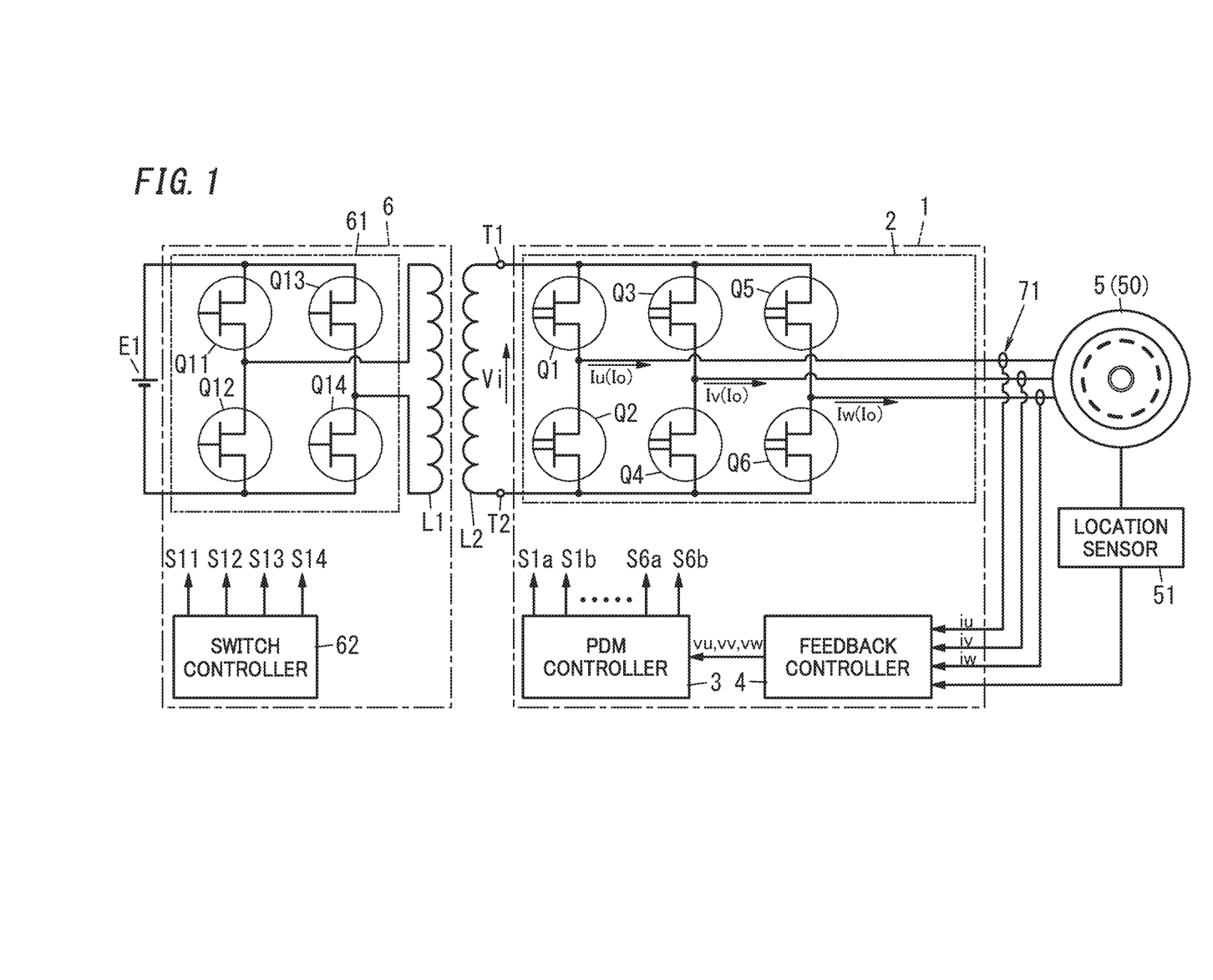
FIG. 1 is a block diagram illustrating a power conversion system of an embodiment of the present disclosure.

A block diagram of a power conversion system 1 according to the present embodiment is shown in FIG. 1. The power conversion system 1 of the present embodiment is configured to perform AC/AC conversion of converting an input alternating-current voltage Vi into an output alternating-current voltage Vo. The power conversion system 1 of the present embodiment receives the input alternating-current voltage Vi from a contactless power supply device 6 by wireless power supply. Moreover, to the power conversion system 1, a synchronous motor 50 is connected as a load 5. The power conversion system 1 outputs the output alternating-current voltage Vo to the synchronous motor 50 to cause rotary drive of the synchronous motor 50.

The power conversion system 1 according to the present embodiment is configured to convert the input alternating-current voltage Vi having a first frequency f1 into the output alternating-current voltage Vo having a second frequency f2 lower than the first frequency f1. The power conversion system 1 includes a voltage converter 2, a Pulse Density Modulation (PDM) controller 3, and a feedback controller 4. The voltage converter 2 is configured to convert the input alternating-current voltage Vi into the output alternating-current voltage Vo in accordance with control signals S1a to S6b and output the output alternating-current voltage Vo to the load 5. The PDM controller 3 is configured to perform pulse density modulation of an output voltage command value of the output alternating-current voltage Vo to generate a PDM signal (a modulation signal), generate the control signals S1a to S6b based on the PDM signal, a polarity of the input alternating-current voltage Vi, and a polarity of the output voltage command value, and output the control signals S1a to S6b to the voltage converter 2. The feedback controller 4 is configured to generate the output voltage command value based on the output current value of the voltage converter 2 and a state of the load 5 and output the output voltage command value to the PDM controller 3.

The power conversion system 1 of the present embodiment performs feedback control of the voltage converter 2 in accordance with the output voltage command value generated in accordance with the output current value of the voltage converter 2 and the state of the load 5. This provides the advantage that in the power conversion system 1 of the present embodiment, the accuracy of output control of the voltage converter 2 is improved.

(2) Overall Configuration

Detailed configurations of the power conversion system 1 and the contactless power supply device 6 will be described below.

(2.1) Contactless Power Supply Apparatus

The contactless power supply device 6 is configured to output the input alternating-current voltage Vi to the power conversion system 1. The contactless power supply device 6 includes an inverter circuit 61, a switch controller 62, and a power feeding coil L1.

The inverter circuit 61 is connected to a direct-current power supply E1 and is a DC/AC inverter configured to convert a direct-current voltage into an alternating-current voltage and output the alternating-current voltage. The inverter circuit 61 includes four switching elements Q11 to Q14. Each of the switching elements Q11 to Q14 is, for example, a semiconductor switch such as a Metal-Oxide-Semiconductor Field Effect Transistor (MOSFET) or Insulated Gate Bipolar Transistor (IGBT). The switching elements Q11 to Q14 include, for example, gallium nitride (GaN). The switching elements Q11 to Q14 are connected in a full bridge configuration. The direct-current power supply E1 has output terminals between which the switching element Q11 is electrically connected to the switching element Q12 in series. Between the pair of output terminals of the direct-current power supply E1, the switching element Q13 is electrically connected to the switching element Q14 in series. In other words, between the pair of output terminals of the direct-current power supply E1, a series circuit of the switching element Q11 and the switching element Q12 is electrically connected to a series circuit of the switching element Q13 and the switching element Q14 in parallel. The switching element Q11 and the switching element Q13 each have a drain electrically connected to a positive electrode of the pair of output terminals of the direct-current power supply E1. The switching element Q12 and the switching element Q14 each have a source electrically connected to a negative electrode of the pair of output terminals of the direct-current power supply E1.

The power feeding coil L1 is electrically connected between a connection point at which a source of the switching element Q11 is connected to a drain of the switching element Q12 and a connection point at which a source of the switching element Q13 is connected to a drain of the switching element Q14.

The switch controller 62 outputs control signals S11 to S14 for respectively controlling the switching elements Q11 to Q14. The switch controller 62 outputs the control signals S11 to S14 directly, or via a drive circuit, to gates of the switching elements Q11 to Q14, thereby individually turning on/off the switching elements Q11 to Q14.

The switch controller 62 controls the switching elements Q11 to Q14 such that a combination of the switching elements Q11 and Q14 and a combination of the switching elements Q12 and Q13 are alternately turned on. In the present embodiment, for example, a frequency at which the switching elements Q11 to Q14 are turned on/off is 1 MHz.

Alternately turning on the combination of the switching elements Q11 and Q14 and the combination of the switching elements Q12 and Q13 converts the direct-current voltage output from the direct-current power supply E1 into the alternating-current voltage and applies the alternating-current voltage to the power feeding coil L1. The frequency of the alternating-current voltage applied to the power feeding coil L1 is the same as a drive frequency of each of the switching elements Q11 to Q14 and is, for example, 1 MHz.

(2.2) Power Conversion System

The power conversion system 1 includes the voltage converter 2, the PDM controller 3, and the feedback controller 4.

(2.2.1) Voltage Converter

The voltage converter 2 is a voltage conversion circuit (AC/AC converter) configured to convert the input alternating-current voltage Vi having the first frequency f1 into the output alternating-current voltage Vo having the second frequency f2 lower than the first frequency f1 in accordance with the control signals S1a to S6b and output the output alternating-current voltage Vo to the load 5. The voltage converter 2 is connected to a power receiving coil L2 and receives an alternating-current voltage generated by the power receiving coil L2 as the input alternating-current voltage Vi.

The power receiving coil L2 is magnetically coupled to the power feeding coil L1. When turning on/off the switching elements Q11 to Q14 applies the alternating-current voltage to the power feeding coil L1, the power receiving coil L2 generates the alternating-current voltage (the input alternating-current voltage Vi). The alternating-current voltage (the input alternating-current voltage Vi) generated by the power receiving coil L2 is applied to the voltage converter 2. The frequency (the first frequency f1) of the input alternating-current voltage Vi is the same as the frequency of the alternating-current voltage applied to the power feeding coil L1 and is, for example, 1 MHz. Note that the frequency of the input alternating-current voltage Vi is not limited to 1 MHz but may be another frequency.

The voltage converter 2 converts the input alternating-current voltage Vi having the first frequency f1 into the output alternating-current voltage Vo having the second frequency f2 lower than the first frequency f1 and outputs the output alternating-current voltage Vo to the load 5. The frequency (the second frequency f2) of the output alternating-current voltage Vo is, for example, 100 Hz. Note that the frequency of the output alternating-current voltage Vo is not limited to 100 Hz but may be another frequency. Here, the first frequency f1 is preferably satisfactorily higher than the second frequency f2, Specifically, the digit number of the first frequency f1 is preferably larger than the digit number of the second frequency f2 by three or more digits. More specifically, the first frequency f1 is preferably 1000 or more times the second frequency f2. For example, when the second frequency f2 is 100 Hz, the first frequency f1 preferably has a value 1000 or more times the value of the second frequency f2, that is, is preferably 100 kHz or higher. Increasing the frequency ratio of the frequency (the first frequency f1) of the input alternating-current voltage Vi to the frequency (the second frequency f2) of the output alternating-current voltage Vo provides a high-resolution and smooth three-phase alternate-current power output when PDM control is used.

In the present embodiment, the voltage converter 2 is connected to the synchronous motor 50 as the load 5. In other words, in the present embodiment, the load 5 is the synchronous motor 50. Specifically, the load 5 is a permanent magnet synchronous motor having a rotor including a permanent magnet. Thus, the voltage converter 2 outputs an output alternating-current Vo of three phases (U phase, V phase, W phase) to perform rotary drive of the synchronous motor 50. That is, in the present embodiment, the voltage converter 2 converts a single-phase input alternating-current voltage Vi into a three-phase output alternating-current voltage Vo and outputs the three-phase output alternating-current voltage Vo. In other words, the input alternating-current voltage Vi has a single phase, and the output alternating-current voltage Vo has three phases. In the present embodiment, when the three phases (U phase, V phase, W phase) of the output alternating-current voltage Vo are distinguished from one another, an output alternating-current voltage Vo corresponding to the U phase is referred to as a U-phase output alternating-current voltage Vu, an output alternating-current voltage Vo corresponding to the V phase is referred to as a V-phase output alternating-current voltage Vv, and an output alternating-current voltage Vo corresponding to the W phase is referred to as a W-phase output alternating-current voltage Vw.

The voltage converter 2 of the present embodiment is a matrix converter having a plurality of (in this embodiment, six) bidirectional switches (switching elements Q1 to Q6).

The switching elements Q1 to Q6 are bidirectional switches configured to bidirectionally conduct and block a current. The switching elements Q1 to Q6 are semiconductor switches such as MOSFETs and IGBTs and include for example, gallium nitride (GaN). The switching elements Q1 to Q6 are connected in a bridge configuration. The power receiving coil L2 has both ends (one end T1 and the other end T2) between which the switching element Q1 is electrically connected to the switching element Q2 in series. Between both of the ends (the one end T1 and the other end T2) of the power receiving coil L2, the switching element Q3 is electrically connected to the switching element Q4 in series. Between both of the ends (the one end T1 and the other end T2) of the power receiving coil L2, the switching device Q5 is electrically connected to the switching element Q6 in series. In other words, between both of the ends of the power receiving coil L2, a series circuit of the switching element Q1 and the switching element Q2, a series circuit of the switching element Q3 and the switching element Q4, and a series circuit of the switching element Q5 and the switching element Q6 are electrically connected to one another in parallel. The switching elements Q1, Q3, and Q5 are connected to the one end T1 of the power receiving coil L2, and the switching elements Q2, Q4, and Q6 are connected to the other end T2 of the power receiving coil L2. In the present embodiment, when in the input alternating-current voltage Vi generated between the one end T1 and the other end T2 of the power receiving coil L2, a potential of the one end T1 with reference to a potential of the other end T2 has a positive value, the polarity of the input alternating-current voltage Vi is defined as being "positive". In contrast, when in the input alternating-current voltage Vi, the potential of the one end T1 with reference to the potential of the other end T2 has a negative value, the polarity of the input alternating-current voltage Vi is defined as being "negative".

The switching elements Q1 and Q2 in a pair correspond to the U phase of the three phases. A connection point at which the switching element Q1 is connected to the switching element Q2 is electrically connected to the synchronous motor 50. The switching elements Q3 and Q4 in a pair correspond to the V phase of the three phases. A connection point at which the switching element Q3 is connected to the switching element Q4 is electrically connected to the synchronous motor 50. The switching elements Q5 and Q6 in a pair correspond to the W phase of the three phases. A connection point at which the switching element Q5 is connected to the switching element Q6 is electrically connected to the synchronous motor 50.

Turning on/off the switching elements Q1 to Q6 supplies a three-phase output alternating current Io from the voltage converter 2 to the synchronous motor 50. In the present embodiment, the potential, with respect to a potential at a neutral point of three-phase electric power, at the connection point at which the switching element Q1 is connected to the switching element Q2 is defined as the U-phase output alternating-current voltage Vu. Moreover, an output alternating current Io flowing between the synchronous motor 50 and the connection point at which the switching element Q1 is connected to the switching element Q2 is defined as a U-phase output alternating current Iu. When the U-phase output alternating current Iu flows toward the synchronous motor 50 from the connection point at which the switching element Q1 is connected to the switching element Q2, the polarity of the U-phase output alternating current Iu is defined as being "positive". Moreover, the potential, with respect to a potential at a neutral point of three-phase electric power, at the connection point at which the switching element Q3 is connected to the switching element Q4 is defined as the V-phase output alternating-current voltage Vv. Moreover, an output alternating current Io flowing between the synchronous motor 50 and the connection point at which the switching element Q3 is connected to the switching element Q4 is defined as a V-phase output alternating current Iv. When the V-phase output alternating current Iv flows toward the synchronous motor 50 from the connection point at which the switching element Q3 is connected to the switching element Q4, the polarity of the V-phase output alternating current Iv is defined as being "positive".

Moreover, the potential, with respect to a potential at a neutral point of three-phase electric power, at the connection point at which the switching element Q5 is connected to the switching element Q6 is defined as the W-phase output alternating-current voltage Vw. Moreover, an output alternating current Io flowing between the synchronous motor 50 and the connection point at which the switching element Q5 is connected to the switching element Q6 is defined as a W-phase output alternating current Iw. When the W-phase output alternating current Iw flows toward the synchronous motor 50 from the connection point at which the switching element Q5 is connected to the switching element Q6, the polarity of the W-phase output alternating current Iw is defined as being "positive".

(2.2 2) PDM Controller

The PDM controller 3 outputs the control signals S1a, S1b to S6a, S6b for controlling the switching elements Q1 to Q6. Specifically, the PDM controller 3 outputs the control signals S1a and S1b to two gates of the switching element Q1 to control turning on/off of the switching element Q1. Similarly, the PDM controller 3 outputs the control signals S2a, S2b to S6a, S6b respectively to the switching elements Q2 to Q6 to control turning on/off of the switching elements Q2 to Q6. The PDM controller 3 outputs the control signals S1a, S1b to S6a, S6b, directly, or via a drive circuit, to two gates of the switching elements Q1 to Q6 to individually turn on/off the switching elements Q1 to Q6.

PDM controller 3 performs, in synchrony with a timing at which the input alternating-current voltage Vi is zero, pulse density modulation (PDM) in accordance with each of the three phases (U phase, V phase, W phase) of the output voltage command value. In other words, the PDM controller 3 generates a PDM signal (modulation signal) in synchrony with the timing at which the input alternating-current voltage Vi is zero. The PDM controller 3 is configured to generate the control signals S1a to S6b corresponding to the three phases in accordance with the polarity of each the output voltage command values of the three phases and the polarity of the input alternating-current voltage Vi and outputs the control signals S1a to S6b to the voltage converter 2. in the present embodiment, when three phases (U phase, V phase, W phase) of the output voltage command value are distinguished from each other, an output voltage command value corresponding to the U phase is defined as a U-phase output voltage command value vu, an output voltage command value corresponding to the V phase is defined as a V-phase output voltage command value vv, an output voltage command value corresponding to the W phase is defined as a W-phase output voltage command value vw.

The pulse density modulation control (PDM control) is a control method for forming a waveform with a density and the positive and negative of pulses having a constant width, and the control method defines the pulse having the constant width as a minimum unit of an output and adjusts the density of the pulse to control the output. In the present embodiment, a half wave of the input alternating-current voltage Vi is cut out as a target to be controlled based on the output voltage command value in synchrony with zero crossing of the input alternating-current voltage Vi. Then, the sign (polarity) of the input alternating-current voltage Vi and the sign (polarity) of the output voltage command value are reflected on the half wave, which has been cut out, to form an output waveform (pulse density modulation waveform). The output voltage command value is a target value of the output alternating-current voltage Vo. That is, the waveform of the output voltage command value is a sine wave whose frequency is the second frequency f2. Generation of the output voltage command value will be described in "(2.2.3) Feedback Controller".

In the present embodiment, the PDM controller 3 includes, for example, a microcomputer having a processor and memory. That is, the PDM controller 3 is realized by a computer system including a processor and memory. The processor executes appropriate programs, and thereby, the PDM controller 3 functions as an acquirer 31, a ΔΣ modulator 32, and a signal outputter 33 (see FIG. 2). The program may be stored in the memory in advance, provided via a telecommunications network such as the Internet, or provided by a non-transitory storage medium such as a memory card storing the program.

Figure 3:
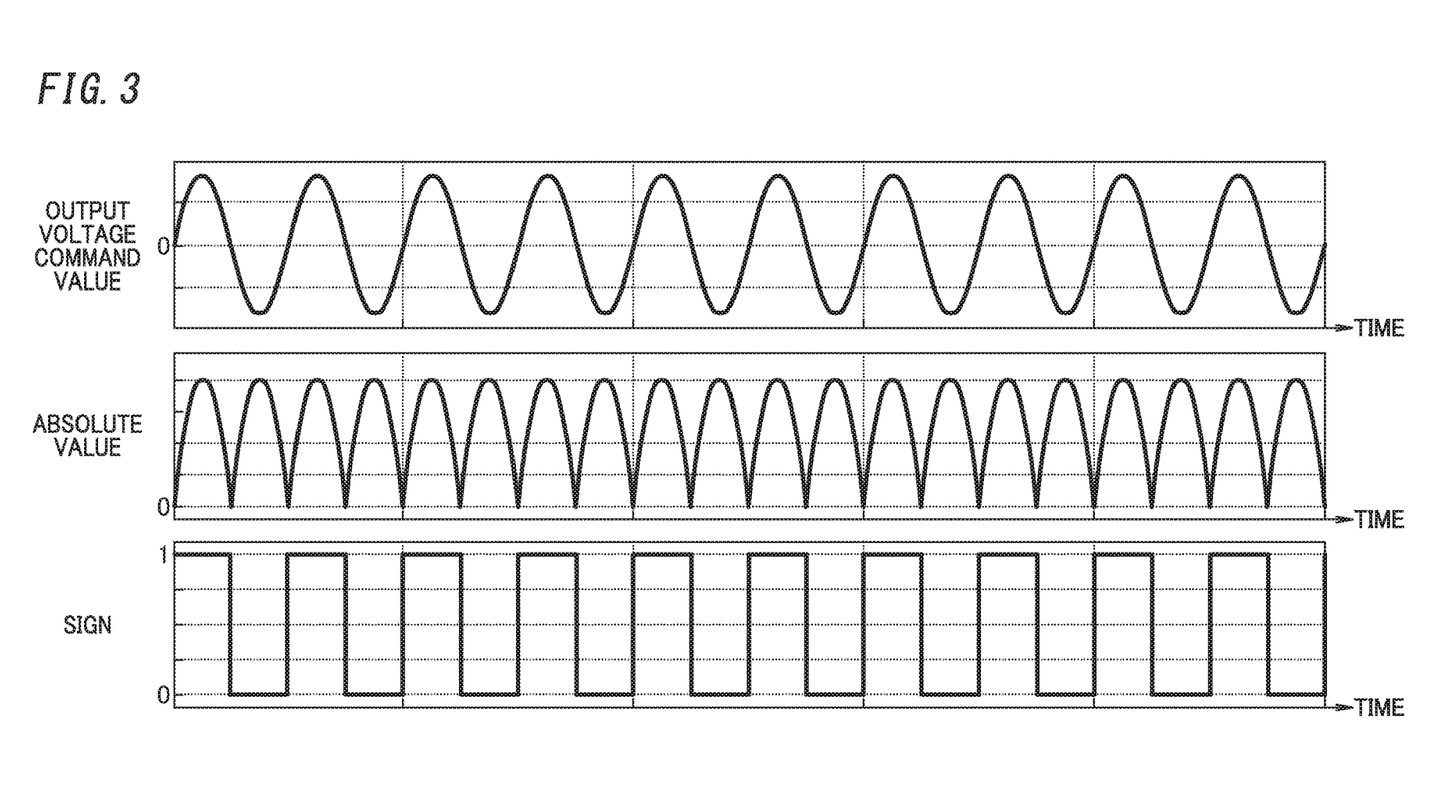
FIG. 3 is a waveform diagram of an output voltage command value, an absolute value, and a sign in the power conversion system.

The acquirer 31 acquires an absolute value and a sign of each of the output voltage command values of the three phases. FIG. 3 shows a waveform diagram illustrating the output voltage command value, the absolute value of the output voltage command value, and the sign of the output voltage command value. As illustrated in FIG. 3, the waveform of the output voltage command value is a sine wave. Thus, the waveform of the absolute value of the output voltage command value is a waveform obtained by full wave rectification of the output voltage command value. Moreover, the sign of the output voltage command value shows the polarity (positive/negative) of the output voltage command value.

Figure 2:
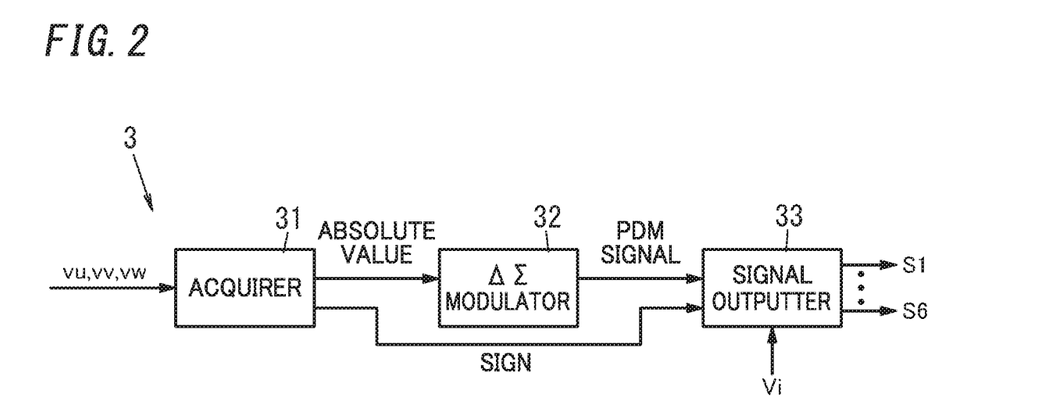
FIG. 2 is a block diagram illustrating a PDM controller in the power conversion system.

The acquirer 31 outputs absolute values of the output voltage command values of the three phases to the ΔΣ modulator 32. The acquirer 31 further outputs signs of the output voltage command values of the three phases to the signal outputter 33.

Figure 4:
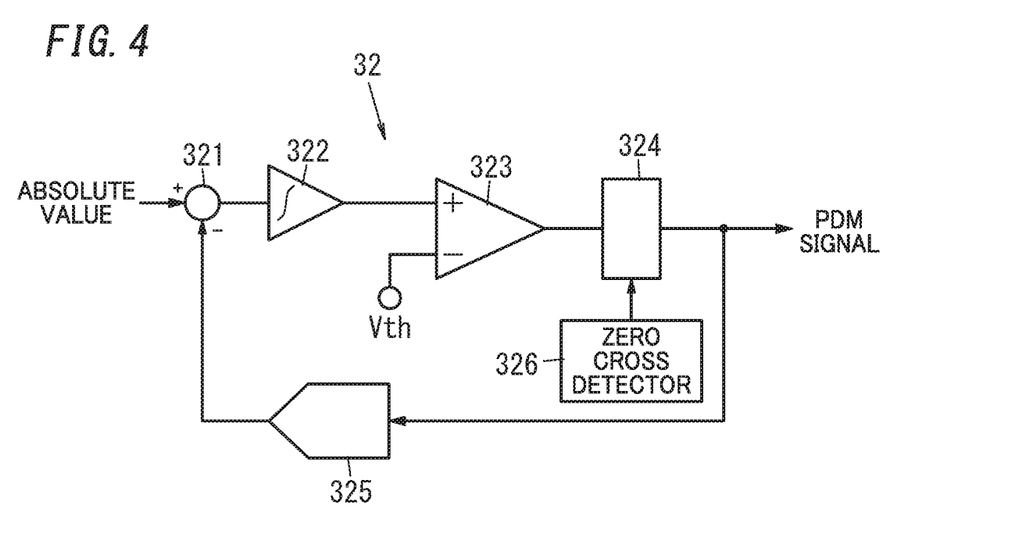
FIG. 4 is a block diagram illustrating a ΔΣ modulator in the power conversion system.

The ΔΣ modulator 32 generates PDM signals corresponding to the respective output voltage command values of the three phases. In the present embodiment, the ΔΣ modulator 32 includes an adder 321, an integrator 322, a comparator 323, a D flip-flop 324, and a D-A converter 325 (see FIG. 4). The adder 321 receives the absolute values of the respective output voltage command values of the three phases and a feedback value of an output of the ΔΣ modulator 32 (the D flip-flop 324). The feedback value is an output value of the D-A converter 325. The D-A converter 325 converts an output value (digital value of 0/1) of the ΔΣ modulator 32 (the D flip-flop 324) into an analog value and outputs the analog value to the adder 321. The adder 321 outputs, to the integrator 322, a value (difference value) obtained by subtracting the feedback value from the absolute value of the output voltage command value. The integrator 322 integrates the value output from the adder 321. The comparator 323 compares an output value of the integrator 322 with a threshold Vth. When the output value of the integrator 322 is larger than the threshold Vth, an output of the comparator 323 is "1", and when the output value of the integrator 322 is smaller than the threshold. Vth, the output of the comparator 323 is "0", The D flip-flop 324 receives a detection signal of a zero cross detector 326. The zero cross detector 326 detects a timing (zero crossing) at which the input alternating-current voltage Vi is zero, and the zero cross detector 326 outputs a sensing result (the detection signal) to the D flip-flop 324. The D flip-flop 324 holds an output value of the comparator 323 in synchrony with the zero crossing of the input alternating-current voltage Vi. An output (PDM signal) from the D flip-flop 324 is output to the signal outputter 33.

The signal outputter 33 outputs the control signals S1a to S6b in accordance with the respective PDM signals output from the Δ modulator 32, the signs (polarities) of the output voltage command values corresponding to the three phases (U phase, V phase, W phase), and the sign (polarity) of the input alternating-current voltage Vi.

Specifically, the signal outputter 33 turns on/off the switching elements Q1 and Q2 in synchrony with the PDM signal corresponding to the U phase. At this time, the signal outputter 33 turns on/off the switching element Q1 and Q2 in accordance with the polarity of the U-phase output voltage command value vu and the polarity of the input alternating-current voltage Vi.

Moreover, the signal outputter 33 turns on/off the switching elements Q3 and Q4 in synchrony with the PDM signal corresponding to the V phase. At this time, the signal outputter 33 turns on/off the switching elements Q3 and Q4 in accordance with the polarity of the V-phase output voltage command value vv and the polarity of the input alternating-current voltage Vi.

Moreover, the signal outputter 33 turns on/off the switching elements Q5 and Q6 in synchrony with the PDM signal corresponding to the W phase. At this time, the signal outputter 33 turns on/off the switching element Q5 and Q6 in accordance with the polarity of the W-phase output voltage command value vw and the polarity of the input alternating-current voltage Vi.

For example, when the polarity of the input alternating-current voltage Vi is "positive" and the polarity of the U-phase output voltage command value vu is "positive", the signal outputter 33 turns on the switching element Q1 and turns off the switching element Q2. When the polarity of the input alternating-current voltage Vi is "positive" and the polarity of the U-phase output voltage command value vu is "negative", the signal outputter 33 turns off the switching element Q1 and turns on the switching element Q2. When the polarity of the input alternating-current voltage Vi is "negative" and the polarity of the U-phase output voltage command value vu is "positive", the signal outputter 33 turns off the switching element Q1 and turns on the switching element Q2. When the polarity of the input alternating-current voltage Vi is "negative" and the polarity of the U-phase output voltage command value vu is "negative", the signal outputter 33 turns on the switching element Q1 and turns off the switching element Q2. Here, only the U phase has been described but similar descriptions apply to the V phase and the W phase.

The switching elements Q1 to Q6 are switched (turned on/off) by the PDM control at a timing at which the input alternating-current voltage Vi is zero. This enables switching losses caused by the switching elements Q1 to Q6 to be reduced. Thus, the power conversion system 1 of the present embodiment improves a power conversion efficiency. Moreover, the ratio of an output voltage to an input voltage (coefficient of use) is higher in the PDM control than in Pulse Width Modulation (PWM) control. That is, in the PDM control, a voltage to be applied to the synchronous motor 50 may be increased as compared to the PWM control.

(2.2.3) Feedback Controller

The feedback controller 4 is configured to generate an output voltage command value based on the output current value of the voltage converter 2 and the state of the load 5 (the synchronous motor 50) and output the output voltage command value to the PDM controller 3. In the present embodiment, the output current value of the voltage converter 2 includes current values of the output alternating currents Io of the three phases. Here, the current value of the U-phase output alternating current Iu is defined as a U-phase output current value iu, the current value of the V-phase output alternating current Iv is defined as a V phase output current value iv, and the current value of the W-phase output alternating current Iw is defined as a W phase output current value iw. Moreover, in the present embodiment, the state of the load 5 (the synchronous motor 50) refers to the rotational position θ and rotational speed ω of the synchronous motor 50. The feedback controller 4 performs feedback control of the output current value of the voltage converter 2 and the rotational position θ and rotational speed ω of the synchronous motor 50 to generate the output voltage command value. Specifically, the feedback controller 4 generates, based on vector control, the output voltage command value.

In the present embodiment, the feedback controller 4 includes, for example, a microcomputer having a processor and memory. That is, the feedback controller 4 is realized by a computer system including a processor and memory. The processor executes appropriate programs to cause the feedback controller 4 to function as a signal processor 41, a first coordinate converter 42, a second coordinate converter 43, adders 44, 46, 48, and PI controllers 45, 47, 49 (see FIG. 5). The program may be stored in the memory in advance, provided via a telecommunications network such as the Internet, or provided by a non-transitory storage medium such as a memory card storing the program.

Figure 5:
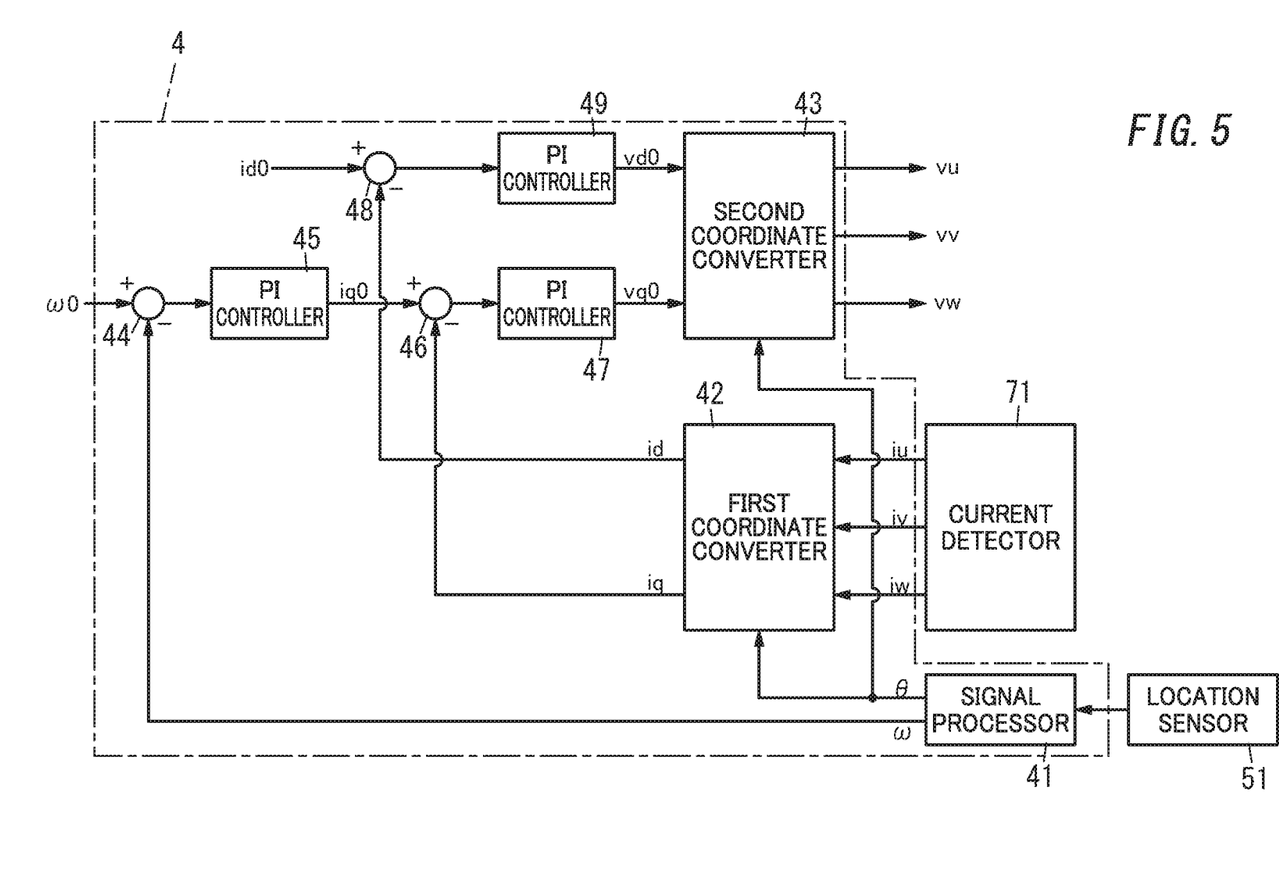
FIG. 5 is a block diagram illustrating a feedback controller in the power conversion system.

The signal processor 41 computes the rotational position θ and rotational speed ω of the synchronous motor 50 in accordance with an output signal of a location sensor 51 provided to the synchronous motor 50. The synchronous motor 50 is provided with an encoder as the location sensor 51. In the present embodiment, the signal outputter 33 performs a mechanical angle offset correction of a count value of the encoder and computes, as the rotational position θ, an electric angle having a value reflecting the number of pole pairs of the synchronous motor 50. Moreover, the signal processor 41 computes a change (difference) of the rotational position θ during a definite time period as the rotational speed ω. The signal processor 41 outputs the rotational position θ thus computed to the first coordinate converter 42 and the second coordinate converter 43. Moreover, the signal processor 41 outputs the rotational speed ω thus calculated to the adder 44.

The first coordinate converter 42 computes a d-axis current value id and a q-axis current value iq from the output current values iu, iv, and iw of the three phases and the rotational position θ by an arithmetic process of coordinate conversion. The output current values iu, iv, and iw of the three phases are detected by a current detector 71. The current detector 71 includes, for example, a current transformer or a Hall element. The current detector 71 detects the U-phase output alternating current Iu, the V-phase output alternating current Iv, and the W-phase output alternating current Iw and outputs the U-phase output current value iu, the V-phase output current value iv, and the W-phase output current value iw as sensing results to the first coordinate converter 42. The first coordinate converter 42 includes an A-D converter and converts the output current values iu, iv, and iw of the three phases into digital values and uses the digital values in the arithmetic process.

The first coordinate converter 42 performs a coordinate conversion process of converting a three-phase fixed coordinate (u, v, w) into a two-phase rotated coordinate (d, q) to compute the d-axis current value id and the q-axis current value iq (see [Formula 1]).

$$\begin{pmatrix} id \\ iq \end{pmatrix} = \begin{pmatrix} \cos\theta & -\sin\theta \\ \sin\theta & \cos\theta \end{pmatrix} \cdot \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} iu \\ iv \\ iw \end{pmatrix}$$ [Formula 1]

The first coordinate converter 42 outputs the d-axis current value id thus computed to the adder 48 and outputs the q-axis current value iq thus computed to the adder 46.

The adder 44 receives the rotational speed ω computed by the signal processor 41 and a rotational speed command value ω0 from an external device. The rotational speed command value ω0 is a target value of the rotational speed ω of the synchronous motor 50. The adder 44 outputs, to the PI controller 45, a value (a difference value) obtained by subtracting the rotational speed ω which is a measured value from the rotational speed command value ω0. The PI controller 45 is configured to perform proportional operation and integral operation to generate a q-axis current command value iq0 from the value output from the adder 44. The PI controller 45 outputs the q-axis current command value iq0 thus generated to the adder 46. The adder 46 receives the q-axis current command value iq0 generated by the PI controller 45 and the q-axis current value iq computed by the first coordinate converter 42. The adder 46 outputs, to the PI controller 47, a value (difference value) obtained by subtracting the q-axis current value iq which is a measured value from the q-axis current command value iq0. The PI controller 47 is configured to perform the proportional operation and the integral operation to generate a q-axis voltage command value vq0 from the value output from the adder 46. The PI controller 47 outputs the q-axis voltage command value vq0 thus generated to the second coordinate converter 43.

Moreover, the adder 48 receives the d-axis current value id computed by the first coordinate converter 42 and a d-axis current command value id0 from the external device. The d-axis current command value id0 is a target value of a d-axis current of the synchronous motor 50. In the present embodiment, the d-axis current command value id0 is, for example, 0. The adder 48 outputs, to the PI controller 49, a value (difference value) obtained by subtracting the d-axis current value id which is a measured value from the d-axis current command value id0. The PI controller 49 is configured to perform the proportional operation and the integral operation to generate a d-axis voltage command value vd0 from the value output from the adder 48. The PI controller 49 outputs the d-axis voltage command value vd0 thus generated to the second coordinate converter 43.

In the PI controllers 45, 47, and 49, transfer functions G(s) are obtained by [Formula 2]. Kp is a proportional gain, and Ti is an integral time constant.

$$G(s) = Kp \cdot \frac{1 + sTi}{sTi}$$ [Formula 2]

The proportional gain Kp and the integral time constant Ti are accordingly set by a feedback loop (major loop) of the rotational speed ω and a feedback loop (minor loop) of the output current values iu, iv, and iw such that the rotational speed followability of the synchronous motor 50 is improved.

The second coordinate converter 43 receives the rotational position θ, the d-axis voltage command value vd0, and the q-axis voltage command value vq0. The second coordinate converter 43 computes the output voltage command values vu, vv, and vw of the three phases (U phase, V phase, W phase) by the arithmetic process of the coordinate conversion from the rotational position θ, the d-axis voltage command value vd0, and the q-axis voltage command value vq0. Specifically, the second coordinate converter 43 performs a coordinate conversion process of converting the two-phase rotated coordinate (d, q) into the three-phase-locked coordinates (u, v, w) to compute the output voltage command values vu, vv, and vw of the three phases. A calculation formula for the output voltage command values vu, vv, and vw of the three phases corresponds to a formula obtained by inverse conversion of [Formula 1] described above, and the detailed description thereof is thus omitted here.

(3) Advantages

Next, advantages of the power conversion system 1 according to the present embodiment will be described.

In the power conversion system 1 of the present embodiment, the feedback controller 4 performs feedback control of the output current values iu, iv, and ivy of the voltage converter 2 and the rotational position θ and rotational speed ω of the synchronous motor 50 to generate the output voltage command values vu, vv, and vw. Thus, in the power conversion system 1, the accuracy of output control of the voltage converter 2 is improved. Consequently, in the power conversion system 1, the control accuracy of the synchronous motor 50 serving as the load 5 to which the output power of the voltage converter 2 is supplied is improved.

Figure 6:
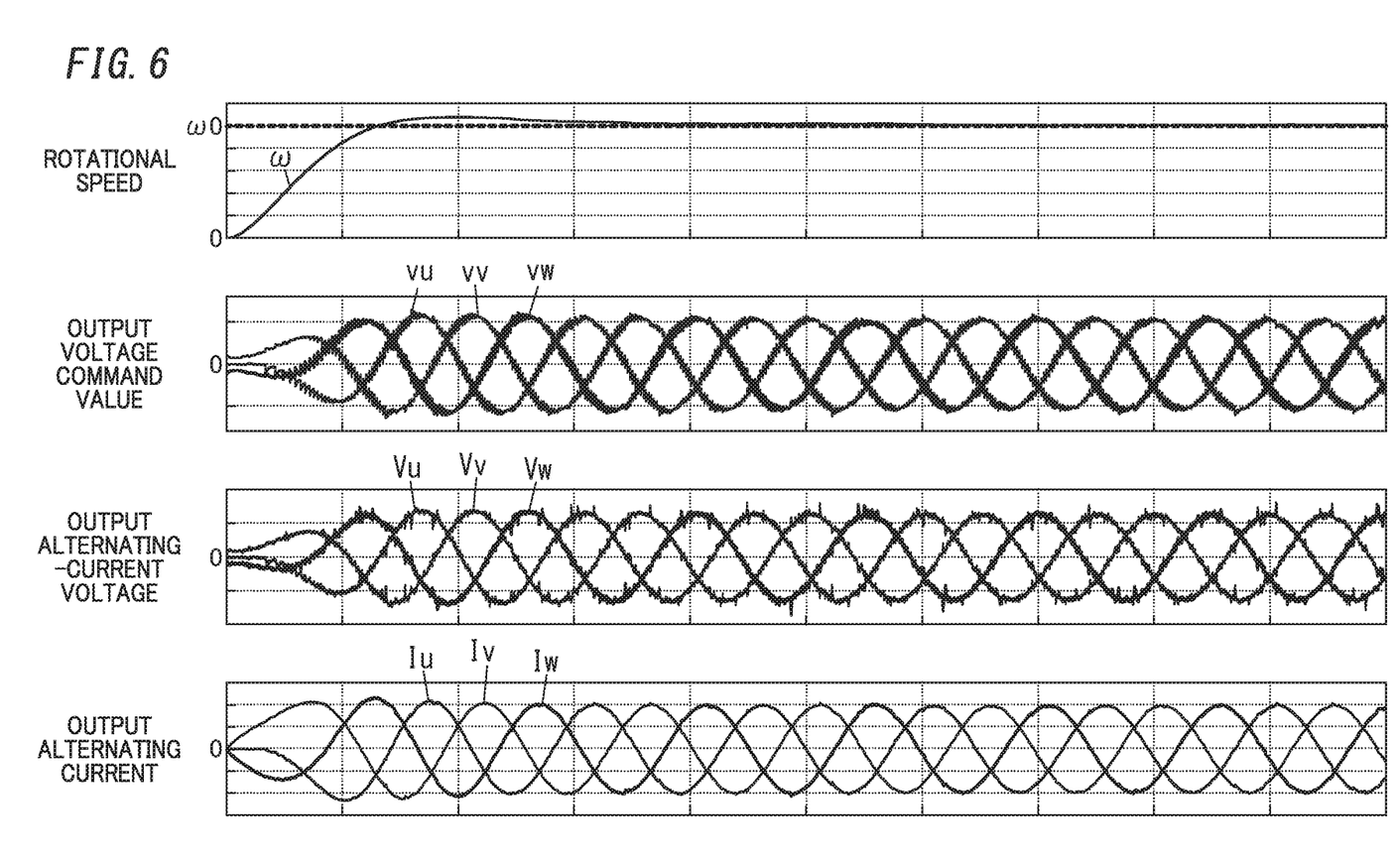
FIG. 6 is a diagram illustrating a result of operation simulation in the power conversion system.

FIG. 6 shows a graph of a result of operation simulation of the power conversion system 1 according to the present embodiment. As illustrated in FIG. 6, the output alternating-current voltages Vu, Vv, and Vw of the three phases respectively change in phase with the output voltage command values vu, vv, and vw of the three phases. Moreover, in the present embodiment, the synchronous motor 50 serving as the load 5 includes an inductance component, and therefore, the output alternating currents Iu, Iv, and Iw of the three phases have phase lags with respect to the output alternating-current voltages Vu, Vv, and Vw of the three phases. Moreover, the rotational speed w of the synchronous motor 50 converges to a prescribed rotational speed command value ω0.

Moreover, in the power conversion system I of the present embodiment, the PDM controller 3 performs PDM control of the voltage converter 2. Thus, switching is performed at the timing at which the input alternating-current voltage Vi is zero, and therefore, switching losses are reduced. Moreover, the coefficient of use of the output voltage with respect to the input voltage is higher in the PDM control than in the PWM control, and therefore, the case of the PDM control allows the voltage applied to the synchronous motor 50 to be increased.

Moreover, the power conversion system 1 of the present embodiment receives the input alternating-current voltage Vi from a contactless power supply device 6. Thus, the frequency (the first frequency f1) of the input alternating-current voltage Vi is satisfactorily higher than the frequency (the second frequency f2) of the output alternating-current voltage Vo. In the PDM control, the half period of the input alternating-current voltage Vi is used as one pulse, and therefore, the resolution of the output power increases. This further improves control accuracy of the synchronous motor 50.

Moreover, the voltage converter 2 is constituted by a matrix converter having the switching elements Q1 to Q6 as a plurality of bidirectional switches. This enables the voltage converter 2 to directly perform the AC/AC conversion, and therefore, an electrolytic capacitor may be omitted. Thus, the lifetime of the power conversion system 1 is suppressed from being shortened due to the electrolytic capacitor. In other words, the lifetime of the power conversion system 1 is prolonged.

Control Method for Voltage Conversion Circuit

Functions similar to those of the power conversion system 1 are realizable also by a control method for the voltage converter 2 (hereinafter also referred to as a voltage conversion circuit 2).

Figure 7:
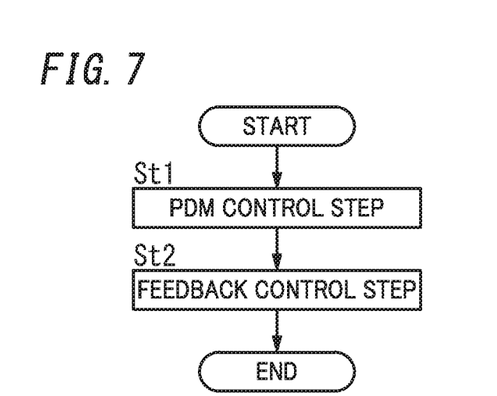
FIG. 7 is a flowchart illustrating a control method for a voltage conversion circuit according to one embodiment of the present disclosure.

Next, the control method for the voltage converter 2 will be described. A control method according to the present embodiment is a method for controlling the voltage conversion circuit 2 configured to convert the input alternating-current voltage Vi having the first frequency f1 into the output alternating-current voltage Vo having the second frequency f2 lower than the first frequency f1 in accordance with the control signals S1$a$ to S6$b$ and output the output alternating-current voltage Vo to the load 5. As illustrated in FIG. 7, the control method for the voltage conversion circuit 2 includes a PDM control step St1 and a feedback control step St2.

The PDM control step St1 is a step of performing pulse density modulation of an output voltage command value of the output alternating-current voltage Vo to generate a PDM signal (a modulation signal) and generating the control signals S1$a$ to S6$b$ based on the PDM signal, a polarity of the input alternating-current voltage Vi, and a polarity of the output voltage command value. That is, in the PDM control step SU, the control signals S1$a$ to S6$b$ are output to the voltage conversion circuit 2 to perform the PDM control of the voltage conversion circuit 2.

The feedback control step St2 is a step of generating the output voltage command value based on an output current value supplied to the load 5 and a state of the load 5. That is, the feedback control step St2 performs feedback control of generating the output voltage command value based on the output current value of the voltage conversion circuit 2 and the state of the load 5 (in the present embodiment, the rotational speed w and the rotational position θ of the synchronous motor 50).

The control method for the voltage conversion circuit 2 according to the present embodiment also improves the accuracy of output control of the voltage conversion circuit 2. Consequently, in the control method of the voltage conversion circuit 2, the control accuracy of the synchronous motor 50 serving as the load 5 to which the output power from the voltage conversion circuit 2 is supplied is improved.

The control method for the voltage conversion circuit 2 is realizable by a program executed by a computer system.

The power conversion system 1 includes a computer system in the PDM controller 3, the feedback controller 4, and the like. The computer system includes, as main components, a processor and a memory as hardware. The processor executes programs stored in the memory of the computer system, thereby realizing functions as the PDM controller 3, the feedback controller 4, and the like. The program may be stored in the memory of the computer system in advance, provided via telecommunications network, or provided as a non-transitory recording medium such as a computer system-readable memory card, optical disc, or hard disk drive storing the program. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation. Moreover, the PDM controller 3 and the feedback controller 4 may be included in different chips or may be collected on one chip.

(5) Variations

The embodiment described above is a mere example of various embodiments of the present disclosure. Various modifications may be made depending on design and the like as long as the object of the present disclosure is achieved. Variations of the power conversion system 1 according to the embodiment will be described below. Note that any of the variations to be described below may be combined as appropriate.

In the example described above, the voltage converter 2 is constituted by a matrix converter having the switching elements Q1 to Q6 as a plurality of bidirectional switches, but the voltage converter 2 is not limited to this example. The voltage converter 2 may be constituted by an indirect-type matrix converter including a rectifier circuit and an inverter circuit having a plurality of unidirectional switches.

In the above-described example, the synchronous motor 50 serving as the load 5 is a rotary motor but may be a linear motor.

Moreover, in the above-described example, the input alternating-current voltage Vi is input to the voltage converter 2 from the contactless power supply device 6 by wireless power supply, but this should not be construed as limiting. To the voltage converter 2, the input alternating-current voltage Vi may be input from a power supply device different from the contactless power supply device 6 by contact power supply. Moreover, the input alternating-current voltage Vi may be generated by converting the frequency of an alternating current voltage generated at the power receiving coli L2.

Moreover, the load 5 is not limited to the synchronous motor 50 but may be, for example, an electromagnetic cooking device. In this case, the voltage converter 2 outputs the output alternating-current voltage Vo to an inductor of the electromagnetic cooking device. Moreover, the feedback controller 4 generates the output voltage command value based on the temperature of the electromagnetic cooking device, specifically, the temperature of a cooking appliance placed on the electromagnetic cooking device as the state of the load 5.

Moreover, the output alternating-current voltage Vo is not limited to the three-phase output alternating current voltage but may be a single-phase output alternating current voltage.

(6) Summary

A power conversion system (I) of a first aspect is configured to convert an input alternating-current voltage (Vi) having a first frequency (f1) into an output alternating-current voltage (Vo) having a second frequency (f2) lower than the first frequency (f1). The power conversion system (1) includes a voltage converter (2), a PDM controller (3), and a feedback controller (4). The voltage converter (2) is configured to convert the input alternating-current voltage (Vi) into the output alternating-current voltage (Vo) in accordance with control signals (S1$a$ to S6$b$) and output the output alternating-current voltage (Vo) to a load (5). The PDM controller (3) is configured to perform pulse density modulation of an output voltage command value of the output alternating-current voltage (Vo) to generate a modulation signal (PDM signal), generate the control signals (S1a to S6b) in accordance with the modulation signal, a polarity of the input alternating-current voltage (Vi), and a polarity of the output voltage command value, and output the control signals (S1a to S6b) to the voltage converter (2). The feedback controller (4) is configured to generate the output voltage command value based on an output current value of the voltage converter (2) and a state of the load (5) and output the output voltage command value to the PDM controller (3).

With this aspect, the feedback controller (4) performs feedback control of the output current value of the voltage converter (2) and the state of the load (5) to generate the output voltage command value. Thus, in the power conversion system (1), the accuracy of output control of the voltage converter (2) is improved.

In a power conversion system (1) of a second aspect referring to the first aspect, the PDM controller (3) is configured to generate the modulation signal (PDM signal) in synchrony with a timing at which the input alternating-current voltage (Vi) is zero.

This aspect enables the voltage converter (2) to operate in synchrony with the timing at which the input alternating-current voltage (Vi) is zero, which reduces electric power losses.

In a power conversion system (1) of a third aspect referring to the first or second aspect, the feedback controller (4) is configured to perform vector control to generate the output voltage command value.

With this aspect, the accuracy of the output voltage command value is improved.

In a power conversion system (1) of a fourth aspect referring to any one of the first to third aspects, the input alternating-current voltage (Vi) has a single phase. The output alternating-current voltage (Vo) has three phases.

This aspect enables a three-phase Output alternating-current voltage (Vo) to be supplied to the load (5).

In a power conversion system (1) of a fifth aspect referring to any one of the first to fourth aspects, the load (5) is a synchronous motor (50).

This aspect enables the control accuracy of the synchronous motor (50) to be improved.

In a power conversion system (1) of a sixth aspect referring to any one of the first to fifth aspects, the input alternating-current voltage (Vi) is input by wireless power supply.

With this aspect, the frequency of the input alternating-current voltage (Vi) is relatively high, and thus, the accuracy of pulse density modulation performed by the PDM controller (3) is improved.

In a power conversion system (1) of a seventh aspect referring to any one of the first to sixth aspects, the voltage converter (2) is a matrix converter having a plurality of bidirectional switches (switching elements Q1 to Q6), With this aspect, an electrolytic capacitor in the voltage converter (2) may be omitted, and thus, the lifetime of the power conversion system (1) is suppressed from being shortened.

In a power conversion system (1) of an eighth aspect referring to any one of the first to seventh aspects, a digit number of the first frequency (f1) is larger than a digit number of the second frequency (f2) by three or more digits.

This aspect enables the resolution of the output alternating-current voltage (Vo) to be increased.

A control method for a voltage conversion circuit (2) of a ninth aspect is a method for controlling the voltage conversion circuit (2) configured to convert an input alternating-current voltage (Vi) having a first frequency (f1) into an output alternating-current voltage (Vo) having a second frequency (f2) lower than the first frequency (f1) in accordance with control signals (S1a to S6b) and output the output alternating-current voltage (Vo) to a load (5). The control method for the voltage conversion circuit (2) includes a PDM control step (St1) and a feedback control step (St2). The PDM control step (St1) includes performing pulse density modulation of an output voltage command value of the output alternating-current voltage (Vo) to generate a modulation signal (PDM signal and generating the control signals (S1a to S6b) in accordance with the modulation signal, a polarity of the input alternating-current voltage (Vi), and a polarity of the output voltage command value. The feedback control step (St2) includes generating the output voltage command value based on an output current value supplied to the load (5) and a state of the load (5).

With this aspect, the feedback control step (St2) performs feedback control of the output current value of the voltage conversion circuit (2) and the state of the load (5) to generate the output voltage command value. Thus, in the control method for the voltage conversion circuit (2), the accuracy of output control of the voltage conversion circuit (2) is improved.

REFERENCE SIGNS LIST

1 POWER CONVERSION SYSTEM
2 VOLTAGE CONVERTER (VOLTAGE CONVERSION CIRCUIT)
3 PDM CONTROLLER
4 FEEDBACK CONTROLLER
5 LOAD
50 SYNCHRONOUS MOTOR
Vi INPUT ALTERNATING-CURRENT VOLTAGE
Vo OUTPUT ALTERNATING-CURRENT VOLTAGE
f1 FIRST FREQUENCY
f2 SECOND FREQUENCY
S1a to S6b CONTROL SIGNAL
Q1 to Q6 SWITCHING ELEMENT (BIDIRECTIONAL SWITCH)
St1 PDM CONTROL STEP
St2 FEEDBACK CONTROL STEP

The invention claimed is:
1. A power conversion system configured to convert an input alternating-current voltage having a first frequency into an output alternating-current voltage having a second frequency lower than the first frequency, the power conversion system comprising:
a voltage converter configured to
convert the input alternating-current voltage into the output alternating-current voltage in accordance with a control signal and
output the output alternating-current voltage to a load;
a PDM controller configured to
perform pulse density modulation of an output voltage command value of the output alternating-current voltage to generate a modulation signal, generate the control signal in accordance with the modulation signal, a polarity of the input alternating-current voltage, and a polarity of the output voltage command value, and output the control signal to the voltage converter; and a feedback controller configured to generate the output voltage command value based on an output current value of the voltage converter and a state of the load and output the output voltage command value to the PDM controller.

2. The power conversion system of claim 1, wherein the PDM controller is configured to generate the modulation signal in synchrony with a timing at which the input alternating-current voltage is zero.

3. The power conversion system of claim 2, wherein the feedback controller is configured to generate, based on vector control, the output voltage command value.

4. The power conversion system of claim 3, wherein the input alternating-current voltage has a single phase, and the output alternating-current voltage has three phases.

5. The power conversion system of claim 4, wherein the load is a synchronous motor.

6. The power conversion system of claim 3, wherein the load is a synchronous motor.

7. The power conversion system of claim 2, wherein the input alternating-current voltage has a single phase, and the output alternating-current voltage has three phases.

8. The power conversion system of claim 7, wherein the load is a synchronous motor.

9. The power conversion system of claim 2, wherein the load is a synchronous motor.

10. The power conversion system of claim 1, wherein the feedback controller is configured to generate, based on vector control, the output voltage command value.

11. The power conversion system of claim 10, wherein the input alternating-current voltage has a single phase, and the output alternating-current voltage has three phases.

12. The power conversion system of claim 11, wherein the load is a synchronous motor.

13. The power conversion system of claim 10, wherein the load is a synchronous motor.

14. The power conversion system of claim 1, wherein the input alternating-current voltage has a single phase, and the output alternating-current voltage has three phases.

15. The power conversion system of claim 14, wherein the load is a synchronous motor.

16. The power conversion system of claim 1, wherein the load is a synchronous motor.

17. The power conversion system of claim 1, wherein the input alternating-current voltage is input by wireless power supply.

18. The power conversion system of claim 1, wherein the voltage converter is a matrix converter having a plurality of bidirectional switches.

19. The power conversion system of claim 1, wherein a digit number of the first frequency is larger than a digit number of the second frequency by three or more digits.

20. A control method for a voltage conversion circuit configured to convert an input alternating-current voltage having a first frequency into an output alternating-current voltage having a second frequency lower than the first frequency in accordance with a control signal and output the output alternating-current voltage to a load, the control method comprising:

a PDM control step of performing pulse density modulation of an output voltage command value of the output alternating-current voltage to generate a modulation signal and generating the control signal in accordance with the modulation signal, a polarity of the input alternating-current voltage, and a polarity of the output voltage command value; and a feedback control step of generating the output voltage command value based on an output current value supplied to the load and a state of the load.

* * * * *